United States Patent
Yamamoto

(10) Patent No.: US 7,896,446 B2
(45) Date of Patent: Mar. 1, 2011

(54) ELECTRIC PARKING BRAKE APPARATUS

(75) Inventor: Hidehiro Yamamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/843,220

(22) Filed: Aug. 22, 2007

(65) Prior Publication Data

US 2008/0053761 A1   Mar. 6, 2008

Related U.S. Application Data

(63) Continuation of application No. PCT/JP2006/303822, filed on Feb. 22, 2006.

(30) Foreign Application Priority Data

Mar. 22, 2005   (JP) .................................. 2005-081872

(51) Int. Cl.
*B60T 13/00* (2006.01)
*B60T 8/32* (2006.01)
(52) U.S. Cl. .......... 303/20; 701/70; 701/200; 188/1.11 E
(58) Field of Classification Search ................ 303/3, 15, 303/20, 191; 701/70, 200; 188/1.11 E, 156
See application file for complete search history.

(56) References Cited

U.S. PATENT DOCUMENTS

| 2,980,369 A * | 4/1961 | Ruof ............................ 244/111 |
| 2001/0037919 A1 | 11/2001 | Kikuta et al. ................... 188/74 |
| 2004/0113486 A1 * | 6/2004 | Koga et al. ...................... 303/20 |
| 2004/0158374 A1 * | 8/2004 | Suzuki ............................ 701/36 |
| 2006/0009907 A1 * | 1/2006 | Kuroda et al. ................ 701/200 |

FOREIGN PATENT DOCUMENTS

| DE | 198 36 687 A1 | 8/1999 |
| EP | 0 353 876 A1 | 2/1990 |
| EP | 1 306 277 A2 | 5/2003 |
| JP | 9-292261 A | 11/1997 |
| JP | 2004-66875 A | 3/2004 |
| JP | 2004-161046 A | 6/2004 |
| WO | 99/39951 | 8/1999 |

* cited by examiner

*Primary Examiner* — Melody M. Burch
(74) *Attorney, Agent, or Firm* — Oblon, Spivak, McClelland, Maier & Neustadt, L.L.P.

(57) ABSTRACT

An electric parking brake apparatus for a vehicle includes a state information outputting part and a control part. A navigation device is connected to an accessory power supply of the vehicle. The accessory power supply supplies an electric power even when an ignition switch is turned off. The state information outputting part outputs information regarding a state of operation of a parking brake. The control part instructs the state information outputting part to output the information regarding a state of operation of the parking brake. The state information outputting part outputs the information regarding a state of operation of the parking brake even when a power of the control part is turned off.

19 Claims, 4 Drawing Sheets

ELECTRIC PARKING BRAKE APPARATUS

CROSS REFERENCE TO RELATED APPLICATIONS

This application is a U.S. continuation application, filed under 35 USC 111(a) and claiming the benefit under 35 USC 120 and 365(c), of PCT application JP2006/303822 filed Feb. 22, 2006, and is based upon and claims the benefit of priority under 35 USC §119 from Japanese Patent Application No. 2005-081872, filed Mar. 22, 2005, the entire contents of each of which are incorporated herein by reference.

BACKGROUND OF THE INVENTION

1. Field of the Invention

The present invention relates to electric parking brake apparatus and, more particularly, to an electric parking brake apparatus which outputs a signal indicating a state of operation of a parking brake to outside.

2. Description of the Related Art

Generally, a manual or foot-operated parking brake, which provides a braking force to wheels when parking a vehicle, is provided with a mechanical switch that detects actuation and release of a parking brake. For example, a system such as a navigation system that requires acquisition of information regarding a state of a parking brake is connected to the mechanical switch so as to acquire information regarding the state of the parking brake.

On the other hand, it is difficult to provide a mechanical switch, which detects actuation and release of a parking brake, to an electric parking brake that actuates and releases the parking brake by an electric actuator since the electric actuator and other components must be provided to the parking brake, as compared to the manual or foot-operated parking brake.

For this reason, there is suggested in the following Patent Document 1 an electric parking brake apparatus having an electric parking brake control unit equipped with an input part for inputting a signal for automatically actuating and automatically releasing a parking brake, which signal is output from other control units mounted on a vehicle. Additionally, there is suggested in the following Patent Document 2 a vehicle parking brake apparatus, which is capable of monitoring an electric parking brake apparatus by determining, without depending on a sensor, whether or not the parking brake is abnormal from an arbitrary combination of signals input from points having each switch interposed therebetween.

Patent Document 1: Japanese Laid-Open Patent Application No. 2004-161046

Patent document 2: Japanese Laid-Open Patent Application No. 2004-66875

However, if a mechanical switch is not provided, a power of a control unit or the like, which controls an electric actuator, must be maintained to be turned on so as to output information regarding actuation and release of a parking brake to a system requiring acquisition of the information regarding the parking brake, thereby consuming a power charged in a battery.

DISCLOSURE OF THE INVENTION

It is a general object of the present invention to provide a novel and useful electric parking brake apparatus in which the above-mentioned problems are eliminated.

A more specific object of the present invention is to provide an electronic parking brake apparatus which reduces power consumption when outputting information regarding actuation and release of the parking brake.

In order to achieve the above-mentioned objects, there is provided according to the present invention an electric parking brake apparatus for a vehicle, comprising: a navigation device connected to an accessory power supply of said vehicle, the accessory power supply being configured and arranged to supply an electric power even when an ignition switch is turned off; state information outputting means for outputting information regarding a state of operation of a parking brake; and control means for instructing the state information outputting means to output the information regarding a state of operation of said parking brake, wherein said state information outputting means outputs the information regarding a state of operation of said parking brake to said navigation device even when a power of said control means is turned off.

According to the present invention, an external device can perform a control in accordance with a state of operation of the parking brake even when a power to the control means is turned off. Thus, according to electric parking brake apparatus of the present invention, power consumption for outputting information to actuate and release the parking brake can be reduced.

In the electric parking brake apparatus according to the present invention, the information output by the state information outputting means may be a signal indicating whether the parking brake is actuated or released, and the state information outputting means may output the signal indicating the parking brake being actuated when a power of the control means is turned off. Additionally, the state information outputting means may include a circuit having a transistor for outputting the signal indicating whether the parking brake is actuated or released, and wherein the control means may instruct the state information outputting means to output the signal indicating whether the parking brake is actuated or released by controlling a control voltage of the transistor in accordance with a state of operation of the parking brake.

According to the above-mentioned invention, by using a simplified circuit structure using the transistor, the information regarding a state of operation of the parking brake can be output to an external device when the power of the control means is turned off. The control voltage of the transistor refers to a base voltage or a gate voltage.

In the above-mentioned electric parking brake apparatus, the transistor may be a field effect transistor having a grounded source and an externally connected drain, and the state information output means may include a first transistor having a grounded emitter and a base connected to the control means, and wherein a collector of the first transistor and the base of the transistor are connected via an intermediate connection point so that a second power source, which is turned on even when the control means is turned off, is connected to the intermediate connection point. Accordingly, the state information output means can be easily constituted by a combination of transistors.

Additionally, the electric parking brake apparatus according to the present invention may further comprise: a balancer adjusting a parking brake force of each of left and right wheels; and a sensor detecting the parking brake force adjusted by the balancer, wherein the control means determines a state of operation of the parking brake based on the parking brake force detected by the sensor so as to control the control voltage of the transistor to output the signal indicating whether the parking brake is actuated or released based on a result of the determination. Accordingly, a brake force of the parking brake can be detected after adjusting the balancer, which permits accurate detection of the brake force of the parking brake, thereby enabling the output of the information regarding an accurate state of operation of the parking brake to an external device.

Additionally, the above-mentioned electric parking brake apparatus may further comprise: a cable connected to the parking brake provided to one of the left and right wheels so as to actuate the parking brake by being applied with a tensile force; and an electric actuator that applies the tensile force to the cable, wherein the sensor detects the parking brake force by detecting the tensile force of the cable. Accordingly, an accurate state of operation of the parking brake can be output to an external device by detecting the tension of the cable without directly detecting a brake force.

Further, in the above-mentioned electric parking brake apparatus, the navigation device may include an electronic control unit that permits a use of the navigation device upon receipt of the information output from the state information outputting means.

Other objects, features and advantages of the present invention will become more apparent from the following detailed description when read in conjunction with the accompanying drawings.

BEST MODE FOR CARRYING OUT THE INVENTION

A description will now be given, with reference to the drawings, of an electric parking brake apparatus according to an embodiment of the present invention.

Figure 1:
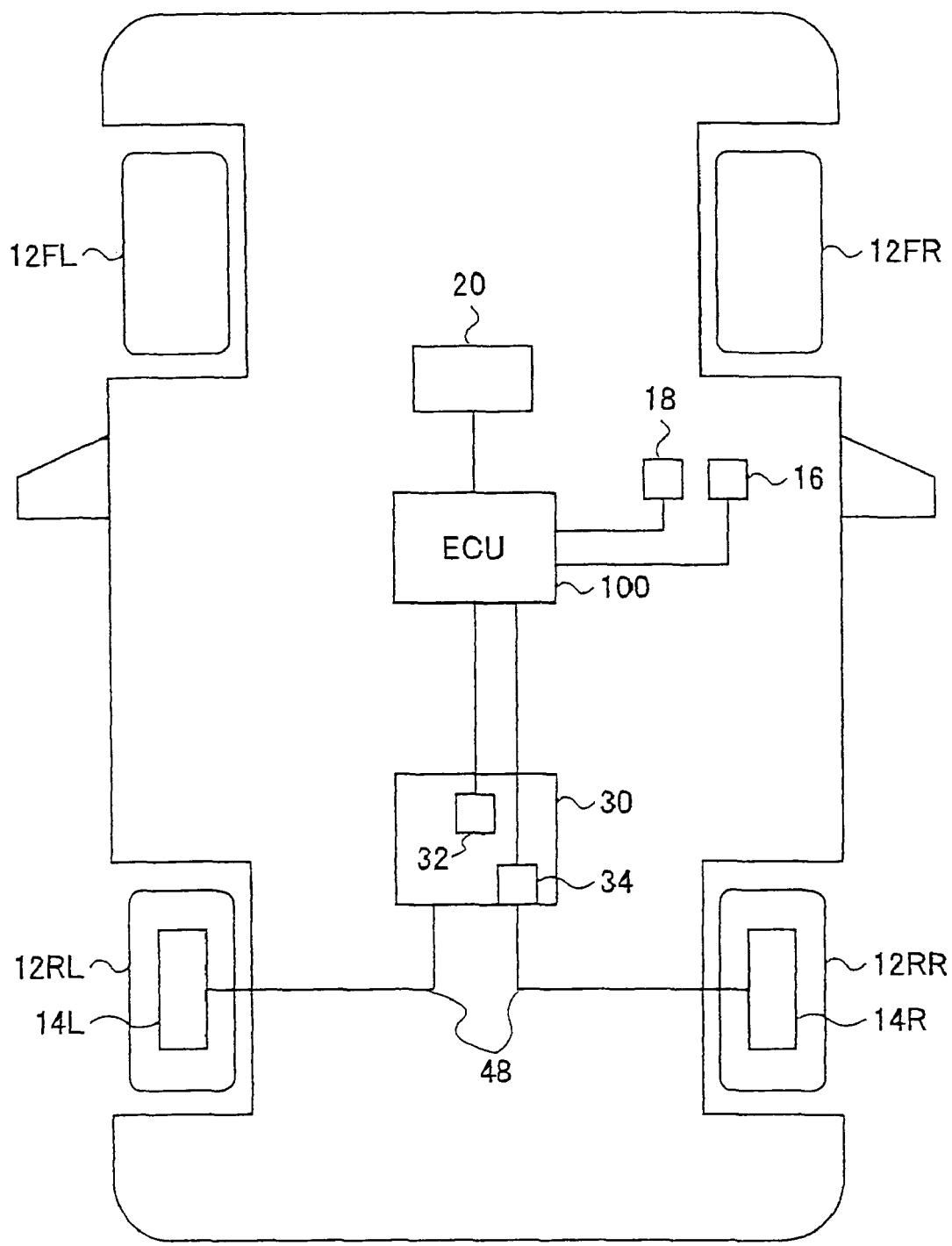
FIG. 1 is an illustrative plan view of a vehicle provided with an electric parking apparatus according to the present invention.

FIG. 1 is an illustrative plan view of a vehicle 10 provided with an electric parking brake apparatus according to the present invention. The vehicle 10 has a left front wheel 12FL, a right front wheel 12FR, a left rear wheel 12RL and a right rear wheel 12RR. Hereinafter, the left front wheel 12FL, the right front wheel 12FR, the left rear wheel 12RL and the right rear wheel 12RR may be collectively referred to as a wheel 12. A left rear wheel parking brake 14L and a right rear wheel parking brake 14R are provided to the left rear wheel 12RL and the right rear wheel 12RR, respectively. The left rear wheel parking brake 14L and the right rear wheel parking brake 14R may be collectively referred to as a parking brake 14.

The left rear wheel parking brake 14L and the right rear wheel parking brake 14R are connected to an electric actuator 30 by cables 48, respectively. A motor 32 is provided in the electric actuator 30. The motor 32 is operated to pull the cables 48 so that the left rear wheel parking brake 14L and the right rear wheel parking brake 14R put brake on the left rear wheel 12RF and the right rear wheel 12RR, respectively, by the cables 48 being given a tensile force. A tension sensor 34 is provided one of the cables 48, which are connected to the left rear wheel parking brake 14L and the right rear wheel parking brake 14R, respectively, so as to detect a tensile force of the cable 48.

In the interior of the vehicle 10, there are provided an ignition switch 16, a parking brake actuation switch 18 and a navigation device 20. A power of the vehicle 10 is turned on and off by the ignition switch 16 being turned on and off by an operator. The navigation device 20 is connected to an accessory power supply, which can supply an electric power even when the ignition switch 16 is turned off. Thus, the operator can operate the navigation device 20 even when the ignition switch 16 is turned off.

An electronic control unit 100 (hereinafter, referred to as "ECU 100") which controls the electric actuator 30 is provided in the vehicle 10. A power of a central processing unit (CPU) is turned on and off by the ignition switch 16 being turned on and off by the operator. Input information of the parking-brake actuation switch 18 is input to the ECU 100 by the parking brake actuation switch 18 being turned on and off by the operator. Additionally, tension data of the cable 48 detected by the tension sensor 34 is also input to the ECU 100.

The ECU 100 determines whether the parking-brake actuation switch 18 is turned on or off based on the input information of the parking-brake actuation switch 18. The ECU 100 inputs an actuation signal into the motor 32 provided in the electric actuator 30 based on the tension data of the cable 48, which is received from the tension sensor 34. In this way, the parking brake 14 is actuated and released, as the parking brake actuation switch 18 being turned on and off, by the motor 32 pulling the cables 48 via the electric actuator 30 or releasing the tension of the cables 48.

Figure 2:
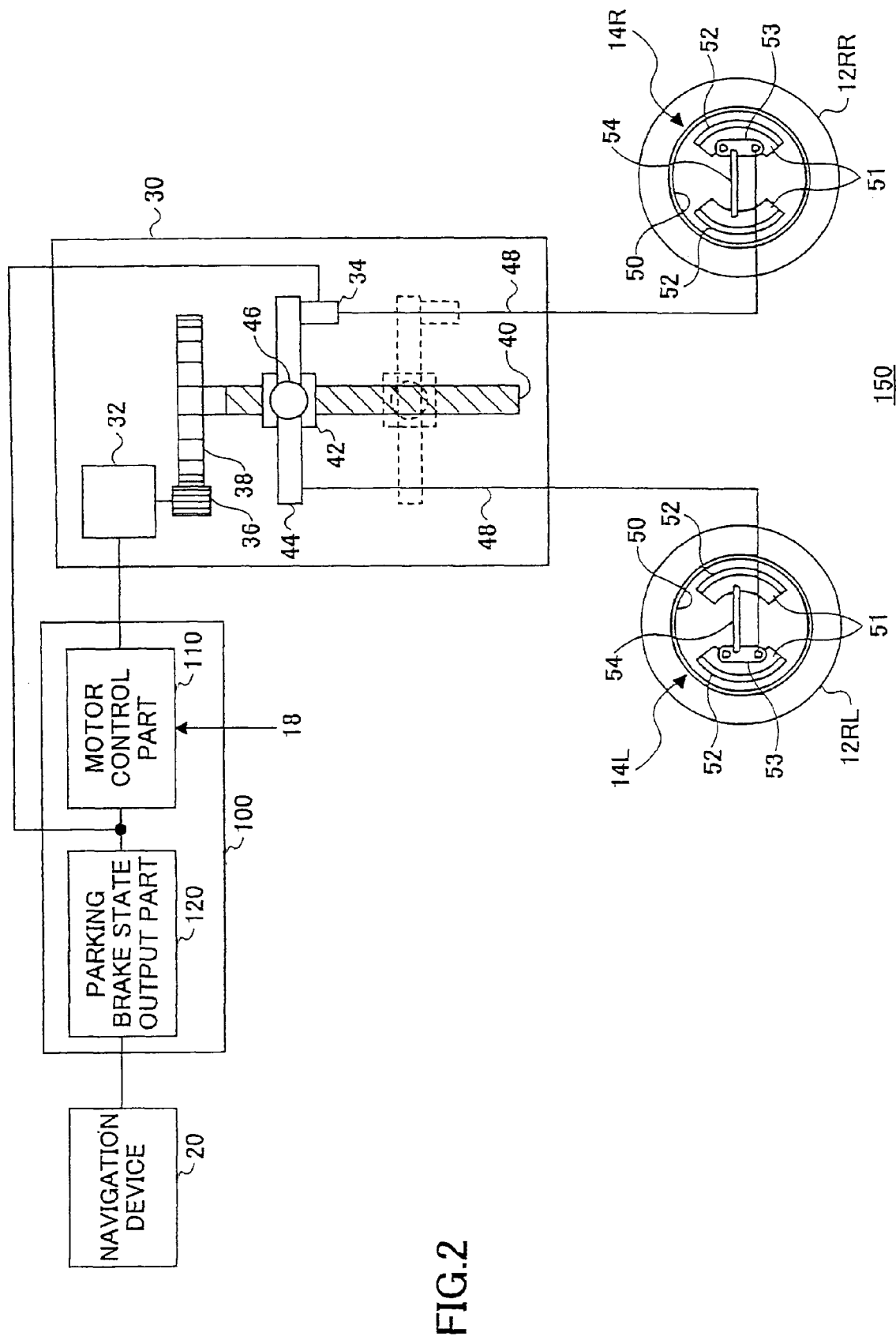
FIG. 2 is a block diagram of the electric parking brake apparatus according to the present invention.

FIG. 2 is a block diagram of the electric parking brake apparatus 150 according to the present invention. The electric parking-brake apparatus 150 comprises: the electric actuator 30; the two cables 48 one of which is connected to the electric actuator 30 and the other is connected to the wheel 12 of the vehicle 10; the tension sensor 34 which detects a tensile force of one of the cables 48; a motor control part 110 which controls the motor 32 provided in the electric actuator 30; and a parking-brake state output part 120 which is connected to external devices such as the navigation device 20 and outputs information indicating whether the parking brake 14 is actuated or released (unactuated) to the external devices.

The electric parking brake apparatus 150 according to the present embodiment is connected to the left rear wheel parking brake 14L provided to the left rear wheel 12RL and the right rear wheel parking brake 14R provided to the right rear wheel 12RR. A drum brake is used as the left rear wheel parking brake 14L and the right rear wheel parking brake 14R. Each of the left rear wheel parking brake 14L and the right rear wheel parking brake 14R comprises: a cylindrical brake drum 50 which is fixed to the wheel 12 so as to rotate with the wheel 12; a pair of brake shoes 51 arranged inside the brake drum 50; and a lining 52 which is fixed to the brake shoes 51 so as to give a brake force to the wheel 12 by being pressed against the brake drum 50.

On end of a brake-shoe lever 53 is rotatably attached to one of the pair of brake shoes 51 by a lever pin, and one end of the cable 48 is connected to the other end of the brake-shoe lever 53. The brake-shoe lever 53 is connected to the other of the brake shoe 51 by a shoe strut 54. Thereby, when the cables 48 are pulled by the electric actuator 30, the pair of brake shoes 51 are expanded by the brake-shoe lever 53 and the shoe strut 54, which cause the lining 52 being pressed against the inner surface of the brake drum 50, thereby giving a brake force to the wheel.

The electric actuator 30 comprises the motor 32, a ball screw 40 driven by the motor 32, a balancer 44, etc. When an actuation signal is input to the motor 32, the motor 32 is actuated and a first gear 36 fixed to a drive shaft of the motor 32 is rotated. The first gear 36 is in engagement with a second gear 38, which is fixed to the ball screw 40 having a ball screw part. Thereby, when the first gear 36 rotates, the ball screw 40 rotates via the second gear 38.

The ball screw part of the ball screw 40 is in engagement with a slide member 42 having a gear part formed on an inner circumferential surface thereof so that the ball screw 40 slides in an axial direction when being rotated. A balancer 44 is rotatably attached to the slide member 42 via a rotation shaft 46. The cables 48, which are connected to the parking brake 14, are connected to both ends of the balancer 44, respectively. Thereby, the slide member 42 is moved in the axial direction of the ball screw 40 by the rotation of the ball screw 40, thereby pulling the cables 48 or release the tension to actuate or release the parking brake 14. Since the balancer 44 is rotatably attached to the slide member 42, a difference in tension of the two cables 48 can be corrected by the rotation of the balancer 44. As a result, the two cables 48 are pulled by the same tension by the actuation of the motor 32, and a brake force is given equally to the left rear wheel 12RL and the right rear wheel 12RR.

The tension sensor 34, which detects the tension of the cable 48, is connected to one of the two cables 48. The tension sensor 34 is provided between the balancer 44 and the parking brake 14. Thereby, the tension sensor 34 can detect a tensile force in a state where the two cables 48 are pulled with the same tension, which enables accurate detection of the tensile force. The tension sensor 34 is connected to the ECU 100, and the tension information of the cable 48 detected by the tension sensor 34 is output to the ECU 100.

The motor control part 110, which outputs an actuation signal to the motor 32 to control the motor 32, is provided in the ECU 100. The ECU 100 has an input reception part, which receives an input of on or off of the parking-brake actuation switch 18 provided in the vehicle 10 so that the ECU 100 causes the motor control part 110 to output the actuation signal to the motor 32 upon reception of the input of on or off of the parking-brake actuation switch 18 by the input reception part. For example, when the input reception part receives the input of on or off of the parking-brake actuation switch 18, the motor control part 110 outputs the actuation signal to the motor 32 to cause the motor 32 to be actuated until the tension of the cable 48 becomes zero based on the tension information of the cable 48 which is received from the tension sensor 34.

The ECU 100 has the parking brake state output part 120 serving as state information outputting means. The parking brake state output part 120 is connected to external devices such as the navigation device 20 so as to output information, which indicates whether the parking brake 14 is actuated or released, to the external devices. The ECU 100 determines whether the parking brake 14 is actuated or released upon reception of the tension information from the tension sensor 34. The ECU 100 sends an instruction to the parking brake state output part 120 provided in the ECU 100 so as to cause the parking brake 14 to output to the external devices information regarding a state of operation of the parking brake 14, which indicates whether the parking brake 14 is actuated or released. The parking brake state output part 120 outputs the information regarding the state of the parking brake 14 to the external devices in accordance with the instruction from the ECU 100.

In the present embodiment, the navigation device 20 is connected to the parking brake state output part 120 of the ECU 100. The navigation device 20 is mounted with a function to determine whether or not the vehicle 10 is being parked so as to permit an operation of the navigation device 20 when the vehicle 10 is being parked for the sake of safety. Upon reception of the input of information indicating the state of the parking brake 14 from the parking brake state output part 120, the navigation device 20 determines whether or not the vehicle is being parked. If it is determined that the vehicle 10 is being parked, an operator is permitted to operate the navigation device 20. On the other hand, if it is determined that the vehicle is not being parked, the navigation device 20 is prohibited from being operated. Thereby, safety when the operator operates the navigation device 20 can be improved.

As mentioned above, the electric parking brake apparatus 150 outputs the information indicating a state of operation of the parking brake 14 by the ECU 100 sending the instruction to the parking brake state output part 120. However, when the ignition switch 16 is turned off by an operator and the power of the ECU 100 is turned off, the ECU 100 cannot send an instruction to the parking brake state output part 120. However, even when the ignition switch 16 is turned off, the power of the navigation device 20 can be turned on according to the accessory power supply so that the operation of the navigation device 20 can be permitted by assuming that the vehicle 10 is already in a parked state. At this time, the navigation device 20 cannot permit the operator to operate the navigation device 20 unless the information indicating a state of operation of the parking brake 14 is output from the parking brake state output part 120. Thus, in the present embodiment, the information regarding a state of the operation indicating whether the parking brake 14 is actuated or released is output to outside even when the ignition switch 16 is turned off by the operator and the power of the ECU 100 is turned off.

Figure 3:
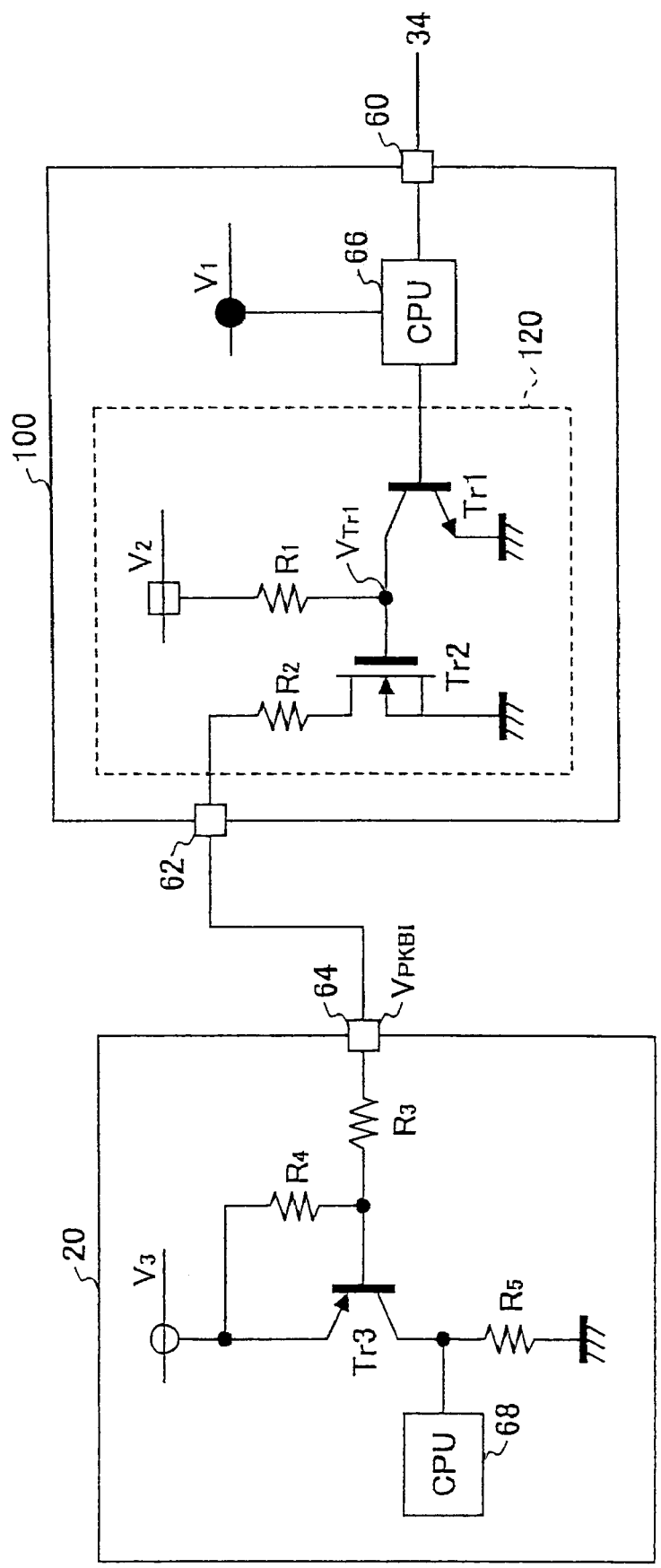
FIG. 3 is a circuit diagram of an ECU and a navigation device shown in FIG. 2.

FIG. 3 is a circuit diagram of the ECU 100 and the navigation device 20. The ECU 100 includes a first CPU 66, a first power supply V1 and the parking brake state output part 120. The parking brake state output part 120 includes a first transistor Tr1, a second transistor Tr2, a second power supply V2, etc.

The first CPU 66 is connected to the first power supply V1 and the parking brake state output part 120. The first power supply V1 is an ignition power supply of 5V which is turned on and off by the ignition switch 16.

The first CPU 66 is connected to a base of the first transistor Tr1. The first transistor Tr1 is an npn-type transistor having a grounded emitter and a collector connected to the transistor Tr2. The second transistor Tr2 is a field effect transistor. The collector of the first transistor Tr1 is connected to a gate of the second transistor Tr2.

A connection point between the first transistor Tr1 and the second transistor Tr2 is connected to the second power supply V2 between the collector of the first transistor Tr1 and the gate of the second transistor Tr2. The second power supply V2 is a backup power supply of 12V, that is, a continuous power supply which is not turned off even when the ignition switch 16 is turned off. A first resistor R1 is provided between the second power supply V2 and the connection point between the first and second transistors Tr1 and Tr2. In the present embodiment, the resistance value of the first resistor R1 is set to 47 kΩ.

The second transistor Tr2 is a MOS (Metal Oxide Semiconductor) field-effect transistor of D type of n-type channel having grounded source. A drain of the second transistor Tr2 is connected to a state output part 62 via a second resistor R2. In the present embodiment, the resistance value of the second resistor R2 is set to 22Ω.

The navigation device 20 includes a second CPU 68, a third transistor Tr3, a third power supply V3, a state input part 64, etc. The state input part 64 is connected to the state output part 62. The state input part 64 is connected to a base of the third transistor Tr3 through the third resistor R3. In the present embodiment, the resistance value of the third resistor R3 is set to 1.5 kΩ.

The third transistor Tr3 is a pnp-type transistor having a collector grounded through a fifth resistor R5. In the present embodiment, the resistance value of the fifth resistor R5 is set to 1 kΩ. Moreover, a connection point between the collector of the third transistor Tr3 and the fifth resistor R5 is connected to a second CPU 68.

An emitter of the third transistor Tr3 is connected to the third power supply V3. The third power supply V3 is an accessory power supply of 5V, and the accessory power supply is maintained in an on-state even when the ignition switch 16 is turned off. A connection point between the emitter of the third transistor Tr3 and the third power supply V3 and a connection point between the base of the third transistor Tr3 and the third resistor R3 are connected to each other through a fourth resistor R4. In the present embodiment, the resistance value of the fourth resistor is set to 1.2 kΩ.

The ECU 100 is connected to the tension sensor 34 which detects the tension of the cable 48, and the detection result of the tension sensor 34 is input into the first CPU 66 of the ECU 100 through a tension input part 60. Based on the detection result of the tension sensor 34, by comparing the tension of the cable 48 with a predetermined value, the ECU 100 determines a state of operation of the parking brake 14, and sends an instruction to the parking brake state output part 120 to output the information regarding the state of operation of the parking brake 14 to the navigation device 20. This instruction is made by controlling a base voltage of the first transistor Tr1 to turn on and off the first transistor Tr1.

For example, in a case where the parking brake actuation switch 18 is turned on by an operator and the electric actuator 30 pulls the cables 48 to actuate the parking brake 14, and in a case where it is determined that the tension of the cable 48 is equal to or greater than a predetermined value according to the detection result of the tension sensor 34, the ECU 100 determines that the parking brake 14 is actuated, and the first CPU 66 stops the voltage supply to the base of the first transistor Tr1. In this case, the first transistor Tr1 is turned off and a current flowing between the second power supply V2 and the emitter of the first transistor Tr1 is cut off. Thereby, a current does not flow through the first resistor R1 and there is no voltage drop due to the first resistor R1 in the voltage of the second power supply V2. Thus, a potential VTr1 at the connection point between the collector of the first transistor Tr1 and the gate of the second transistor Tr2 is changed from low to high. Thereby, a voltage difference is generated between the gate and the source of the second transistor Tr2, which causes the second transistor to be turned on and a current flows between the second power supply V2 and the source of the second transistor Tr2.

Since the second transistor Tr2 is turned on, a current flows from the third power supply V3 of the navigation device 20 to the source of the second transistor Tr2, a current flows to the fourth resistor R4, which generates a voltage drop due to the fourth resistor R4 in the voltage of the third power supply V3. Thereby, the potential VPKBI at the state input part 64 is changed from High to Low, which generates a voltage difference between the emitter and the base of the third transistor Tr3. Thus, a current flows between the emitter and the base, which turns on the third transistor Tr3. Accordingly, a voltage is applied to the second CPU 68, and, thus, the navigation device 20 can recognize that the parking brake 14 is actuated.

Moreover, for example, in a case where the parking brake actuation switch 18 is turned off and the electric actuator 30 cancels the tension of the cables 48 so as to release the parking brake 14 and in a case where it is determined that tension of the cable 48 becomes equal to or smaller than a predetermined value base on a detection result of the tension sensor 34, the ECU 100 determines that the parking brake 14 is released, and the first CPU 66 applies a voltage to the base of the first transistor Tr1. In this case, the first transistor Tr1 is turned on and a current flows between the second power supply V2 and the emitter of the first transistor Tr1. Thereby, a current flows through the first resistor R1, which generates a voltage drop due to the first resistor R1. Accordingly, the potential VTr1 at the connection point between the collector of the first transistor Tr1 and the gate of the transistor Tr2 is turned on, and a current flowing from the second power supply V2 to the source of the second transistor Tr2 is cut off.

Since the second transistor Tr2 is turned off and a current does not flow from the third power supply V3 of the navigation device 20 to the source of the second transistor Tr2 and a current does not flow through the fourth resistor R4, there is no voltage drop generated due to the fourth resistor R4. Thus, there is no voltage difference generated between the emitter and the base of the third transistor Tr3 and a current is cut off, which causes the third transistor Tr3 to be turned off. Thus, no voltage is applied to the second CPU 68, and the navigation device 20 can recognize that the parking brake 14 is released.

Here, when the ignition switch 16 is turned off by the operator, a voltage from the first power supply V1 is not applied and no voltage is applied from the first CPU 66 to the first transistor Tr1 irrespective of whether the parking brake 14 is actuated or released. Thus, similar to the case where the parking brake 14 is actuated, the first transistor Tr1 is turned off and the second transistor is turned on and the third transistor is turned on, which allows the navigation device 20 to recognize that the parking brake 14 is actuated.

Although the first power supply V1, which is an ignition power supply, is interrupted when the ignition switch 16 is turned off, the parking brake state output part 120 can output the information regarding a state of operation of the parking brake 14 to the navigation equipment 20. Consequently, the operator is permitted to operate the navigation device 20 even when the ignition switch 16 is turned off. Thereby, the operator is given an environment where the navigation device 20 is used conveniently.

Figure 4:
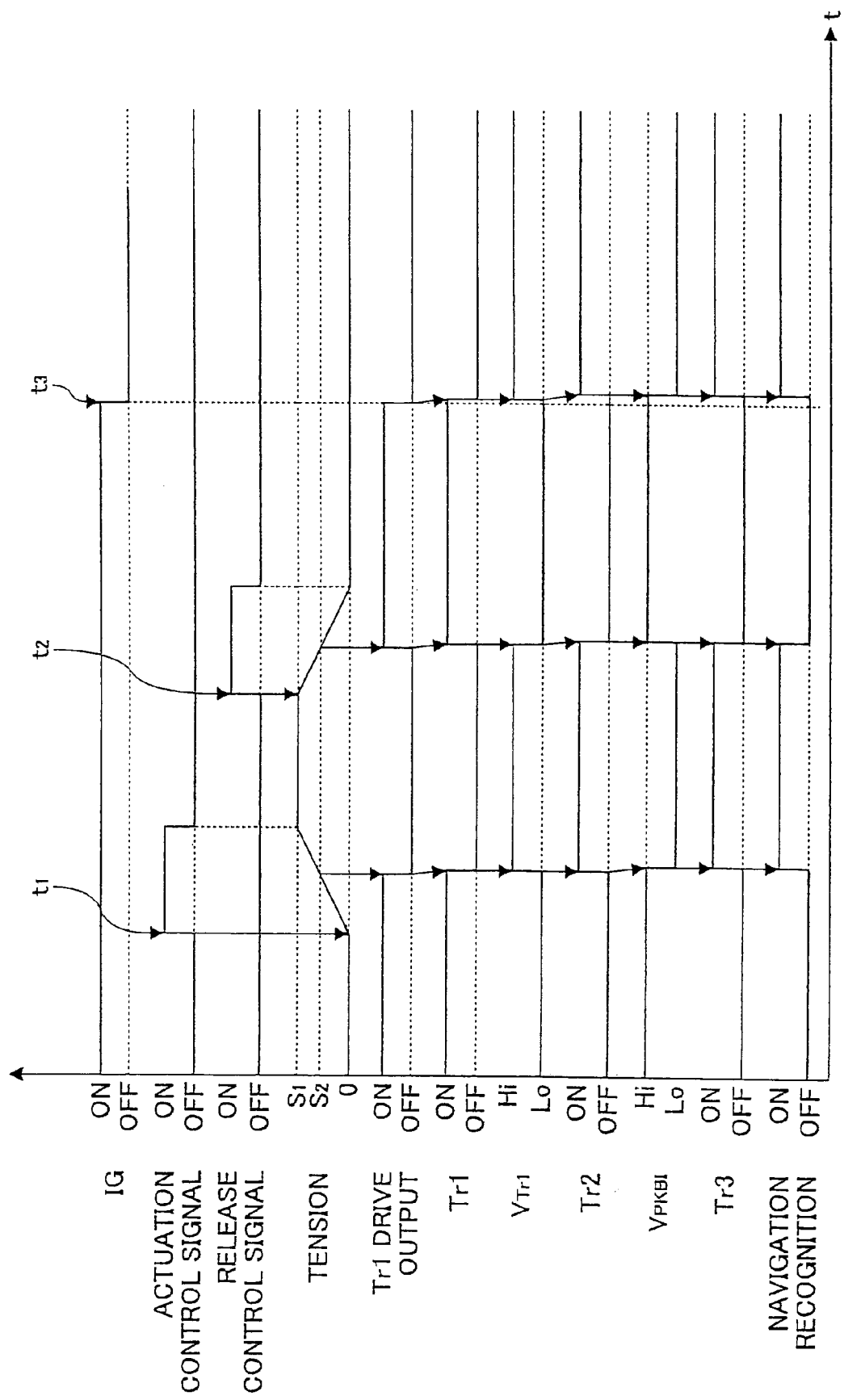
FIG. 4 is a timing chart showing an operation of the electric parking brake apparatus according to the present invention.

FIG. 4 is a timing chart showing an operation of the electric parking brake apparatus 150. The horizontal axis of the time chart of FIG. 4 represents a time t. FIG. 4 shows a case starting from a state where the parking brake 14 is released, the parking brake 14 is actuated at a time t1, and, then, released at a time t2, and thereafter the ignition switch 16 is turned off at a time t3.

When an operator turns on the parking-brake actuation switch at the time t1 in a state where the ignition switch 16 is turned on, the motor control part 110 of the ECU 100 outputs a control signal to the motor 32 so as to start a control of operation of the electric parking brake apparatus 150. The ECU 100 compares the tensile force of the cable 48 with a predetermined value S1 based on the tension information of the cable 48 output by the tension sensor 34, and when the tensile force of the cable 48 reaches the value S1, the ECU 100 causes the motor control part 110 to stop outputting the actuation signal. Thereby, a predetermined brake force can be given to the wheel 12 when the vehicle is parked.

The ECU 100 compares the tensile force of the cable 48 with a predetermined value S2 based on the tension information of the cable 48 output from the tension sensor 34, and when it is determined that the tensile force of the cable 48 is greater than the value S2, the ECU 100 causes the output to drive the first transistor Tr1 to change from on to off, thereby turning off the first transistor Tr1. At this time, the potential VTr1 at the connection point between the collector of the first transistor Tr1 and the gate of the second transistor Tr2, which point is connected to the second power supply V2, is changed from low (Lo) to high (Hi). Thus, a voltage difference is generated between the gate and source of the second transistor Tr2, which turns on the second transistor Tr2.

Since the second transistor Tr2 is turned on, a current flows between the third power supply V3 of the navigation device 20 and the source of the second transistor Tr2. Accordingly, a voltage drop is generated due to the third resistor R3 and the fourth resistor R4 and, thus, the potential VPKBI of the state input part 64 of the navigation device 20 is changed from high (Hi) to low (Lo), which causes the third transistor Tr3 to be turned on since a voltage is applied to the base. Thereby, the navigation device 20 can recognize that the electric parking brake apparatus 150 is actuated.

Then, when the operator turns off the parking brake actuation switch 18 at the time t2, the motor control part 110 of the ECU 100 outputs a control signal to the motor 32 so as to start a control of release of the electric parking brake apparatus 150. The ECU 100 computes the tensile force of the cable 48 based on the tension information of the cable 48 output by the tension sensor 34, and when the tensile force of the cable 48 becomes equal to zero, the ECU 100 causes the motor control part 110 to stop outputting the actuation signal.

The ECU 100 compares the tensile force of the cable 48 with the predetermined value S2 based on the tension information of the cable 48 output from the tension sensor 34, and when it is determined that the tensile force of the cable 48 is smaller than the value S2, the ECU 100 causes the output to drive the first transistor Tr1 to change to on, thereby turning on the first transistor Tr1. At this time, the potential VTr1 at the connection point between the collector of the first transistor Tr1 and the gate of the second transistor Tr2, which point is connected to the second power supply V2, is changed from high (Hi) to low (Lo). Thus, a voltage difference between the gate and source of the second transistor Tr2 is decreased, which turns off the second transistor Tr2.

Since the second transistor Tr2 is turned off, a current flowing between the third power supply V3 of the navigation device 20 and the source of the second transistor Tr2 is cut off. Accordingly, there is no voltage drop generated due to the third resistor R3 and the fourth resistor R4 and, thus, the potential VPKBI of the state input part 64 of the navigation device 20 is changed from low (Lo) to high (hi), which causes the third transistor Tr3 to be turned off since a voltage is not applied to the base. Thereby, the navigation device 20 can recognize that the electric parking brake apparatus 150 is released.

When the ignition switch 16 is turned off by the operator at the time t3, the first power supply is turned off. Accordingly, the output to drive the first transistor Tr1 is changed to off, and, thereby, the first transistor Tr1 is turned off. At this time, similar to the case where the parking brake 14 is actuated, the potential VTr1 is changed from low (Lo) to thigh (Hi), and the second transistor Tr2 is turned on.

Since the second transistor Tr2 is turned on, the potential VPKBI is changed from high (Hi) to low (Lo), which turns on the third transistor Tr3. Thereby, the navigation device 20 can recognize that the electric parking brake apparatus 150 is actuated due to the ignition switch 16 being turned off by the operator even in the state where the first power source V1 is turned off.

The present invention is not limited to the above-mentioned embodiment. Additionally, various design modifications and variations may be made based on knowledge of a person skilled in the art, and embodiments according to such variations may be contained in the scope of the present invention. Such an example is explained below.

The second transistor Tr2 may be a transistor of which control voltage is a base voltage. In this case, the first CPU 66 turns on and off the second transistor Tr2 by controlling the base voltage so as to output the information regarding a state of operation of the parking brake 14 to the navigation device 20.

A disk brake may be used as the left rear wheel parking brake 14L and right rear wheel parking brake 14R. In this case, it may be configured and arranged so that a piston of a brake caliper moves toward a brake disk by the cable 48 being pulled. Accordingly, the left rear wheel 12RL and right rear wheel 12RR are subjected to braking by sandwiching the brake disk between brake pads provided on the piston side and the side opposite to the piston side of the brake disk. It should be noted that only front wheels or all wheels including front wheels and rear wheels may be subjected to braking by the electric parking brake apparatus 150.

In a case of an electric car or a hybrid car, which is driven by an electric motor, the power supply of the ECU 100 may be turned on and off by a drive part starting means such as a switch to turn on and off the power supply of a drive part such as an electric motor for driving a vehicle.

The present invention is not limited to the specifically disclosed embodiments, and variations and modifications may be made without departing from the scope of the present invention.

The present application is based on Japanese priority application No. 2005-081872 filed Mar. 22, 2005, the entire contents of which are hereby incorporated herein by reference.

What is claimed is:

1. An electric parking brake apparatus for a vehicle, comprising:

a navigation device connected to an accessory power supply of said vehicle, the accessory power supply being configured and arranged to supply an electric power to the navigation device even when an ignition switch is turned off;

a state information outputting part that outputs information regarding a state of operation of a parking brake; and a first controller that instructs the state information outputting part to output the information regarding a state of operation of said parking brake, wherein said state information outputting part outputs the information regarding a state of operation of said parking brake to said navigation device even when a power of said first controller is turned off, wherein the information output by said state information outputting part is a signal indicating whether said parking brake is actuated or released, and said state information outputting part outputs the signal indicating said parking brake being actuated when a power of said first controller is turned off, and wherein electric power is supplied from said accessory power supply to a central processing unit of said navigation device when said parking brake is activated and said ignition switch is turned off, and electric power is not supplied from said accessory power supply to the central processing unit of said navigation device when said parking brake is released.

2. The electric parking brake apparatus as claimed in claim 1, wherein said state information outputting part includes a circuit with a second transistor that outputs the signal indicating whether said parking brake is actuated or released, and wherein said first controller instructs said state information outputting part to output the signal indicating whether said parking brake is actuated or released by controlling a control voltage of said second transistor in accordance with a state of operation of said parking brake.

3. An electric parking brake apparatus for a vehicle, comprising:
a navigation device connected to an accessory power supply of said vehicle, the accessory power supply being configured and arranged to supply an electric power even when an ignition switch is turned off;
a state information outputting part that outputs information regarding a state of operation of a parking brake; and
a first controller that instructs the state information outputting part to output the information regarding a state of operation of said parking brake,
wherein said state information outputting part outputs the information regarding a state of operation of said parking brake to said navigation device even when a power of said first controller is turned off,
wherein the information output by said state information outputting part is a signal indicating whether said parking brake is actuated or released, and said state information outputting part outputs the signal indicating said parking brake being actuated when a power of said first controller is turned off,
wherein said state information outputting part includes a circuit with a second transistor that outputs the signal indicating whether said parking brake is actuated or released, and wherein said first controller instructs said state information outputting part to output the signal indicating whether said parking brake is actuated or released by controlling a control voltage of said second transistor in accordance with a state of operation of said parking brake, and
wherein said second transistor is a field effect transistor that includes a grounded source and an externally connected drain, and said state information outputting part includes a first transistor that includes a grounded emitter and a base connected to said first controller, and wherein a collector of the first transistor and a base of said second transistor are connected via an intermediate connection point so that a second power source, which is turned on even when said first controller is turned off, is connected to the intermediate connection point.

4. The electric parking brake apparatus as claimed in claim 2, further including:
a balancer that adjusts a parking brake force of each of left and right wheels; and
a sensor that detects the parking brake force adjusted by said balancer,
wherein said first controller determines a state of operation of said parking brake based on the parking brake force detected by the sensor so as to control the control voltage of said second transistor to output the signal indicating whether said parking brake is actuated or released based on a result of the determination.

5. The electric parking brake apparatus as claimed in claim 4, further including:

a cable connected to said parking brake provided to one of the left and right wheels so as to actuate said parking brake by being applied with a tensile force; and
an electric actuator that applies the tensile force to the cable,
wherein said sensor detects the parking brake force by detecting the tensile force of said cable.

6. The electric parking brake apparatus as claimed in claim 1, further including:
a balancer that adjusts a parking brake force of each of left and right wheels; and
a sensor that detects the parking brake force adjusted by said balancer,
wherein said first controller determines a state of operation of said parking brake based on the parking brake force detected by the sensor so as to instruct said state information outputting part to output the information regarding a state of operation of said parking brake based on a result of the determination.

7. The electric parking brake apparatus as claimed in claim 6, further including:
a cable connected to said parking brake provided to one of the left and right wheels so as to actuate said parking brake by being applied with a tensile force; and
an electric actuator that applies the tensile force to the cable,
wherein said sensor detects the parking brake force by detecting the tensile force of said cable.

8. The electric parking brake apparatus as claimed in claim 1, wherein said navigation device includes an electronic control unit that permits a use of said navigation device upon receipt of the information output from said state information outputting part.

9. The electric parking brake apparatus as claimed in claim 2, wherein said second transistor is a field effect transistor that includes a grounded source and an externally connected drain, and said state information outputting part includes a first transistor that includes a grounded emitter and a base connected to said first controller, and wherein a collector of the first transistor and the base of said second transistor are connected via an intermediate connection point so that a second power source, which is turned on even when said first controller is turned off, is connected to the intermediate connection point.

10. The electric parking brake apparatus as claimed in claim 3, further comprising:
a balancer that adjusts a parking brake force of each of left and right wheels; and
a sensor that detects the parking brake force adjusted by said balancer,
wherein said first controller determines a state of operation of said parking brake based on the parking brake force detected by the sensor so as to control the control voltage of said second transistor to output the signal indicating whether said parking brake is actuated or released based on a result of the determination.

11. The electric parking brake apparatus as claimed in claim 10, further comprising:
a cable connected to said parking brake provided to one of the left and right wheels so as to actuate said parking brake by being applied with a tensile force; and
an electric actuator that applies the tensile force to the cable,
wherein said sensor detects the parking brake force by detecting the tensile force of said cable.

12. The electric parking brake apparatus as claimed in claim 3, wherein said navigation device includes an electronic control unit that permits a use of said navigation device upon receipt of the information output from said state information outputting part.

13. The electric parking brake apparatus as claimed in claim 3, wherein said first controller stops a voltage supply to the base of the first transistor when said first controller determines that the parking brake is actuated.

14. The electric parking brake apparatus as claimed in claim 13, wherein a potential voltage at the connection point between the collector of the first transistor and the base of the second transistor is changed from low to high and causes said second transistor to be turned on when the voltage supply to the base of the first transistor is stopped.

15. The electric parking brake apparatus as claimed in claim 3, wherein the drain of the second transistor is connected to a state output part.

16. The electric parking brake apparatus as claimed in claim 3, wherein said first controller determines that the parking brake is actuated when the tensile force of the cable detected by the sensor is equal to or greater than a predetermined value.

17. An electric parking brake apparatus for a vehicle, comprising:
- a navigation device connected to an accessory power supply of said vehicle, the accessory power supply being configured and arranged to supply an electric power even when an ignition switch is turned off;
- a state information outputting part that outputs information regarding a state of operation of a parking brake; and
- a first controller that instructs the state information outputting part to output the information regarding a state of operation of said parking brake,
- wherein said state information outputting part outputs the information regarding a state of operation of said parking brake to said navigation device even when a power of said first controller is turned off,
- wherein said navigation device includes a transistor including an emitter connected to said accessory power supply of the vehicle,
- wherein a base of said transistor is connected to a state input part through a first resistor,
- wherein a collector of said transistor is grounded through a second resistor, and
- wherein a connection point between the collector of said transistor and said second resistor is connected to a second controller.

18. The electric parking brake apparatus as claimed in claim 17, wherein said transistor is turned off when said state information outputting part outputs a signal indicating that said parking brake is released.

19. The electric parking brake apparatus as claimed in claim 17, wherein said transistor is turned on when said state information outputting part outputs a signal indicating that said parking brake is actuated.

* * * * *